CLASSIFICATION
7448
DIVISION.
Machine for making Cooper's Rivets
2-28-1833
Patented Feb. 28 1833.
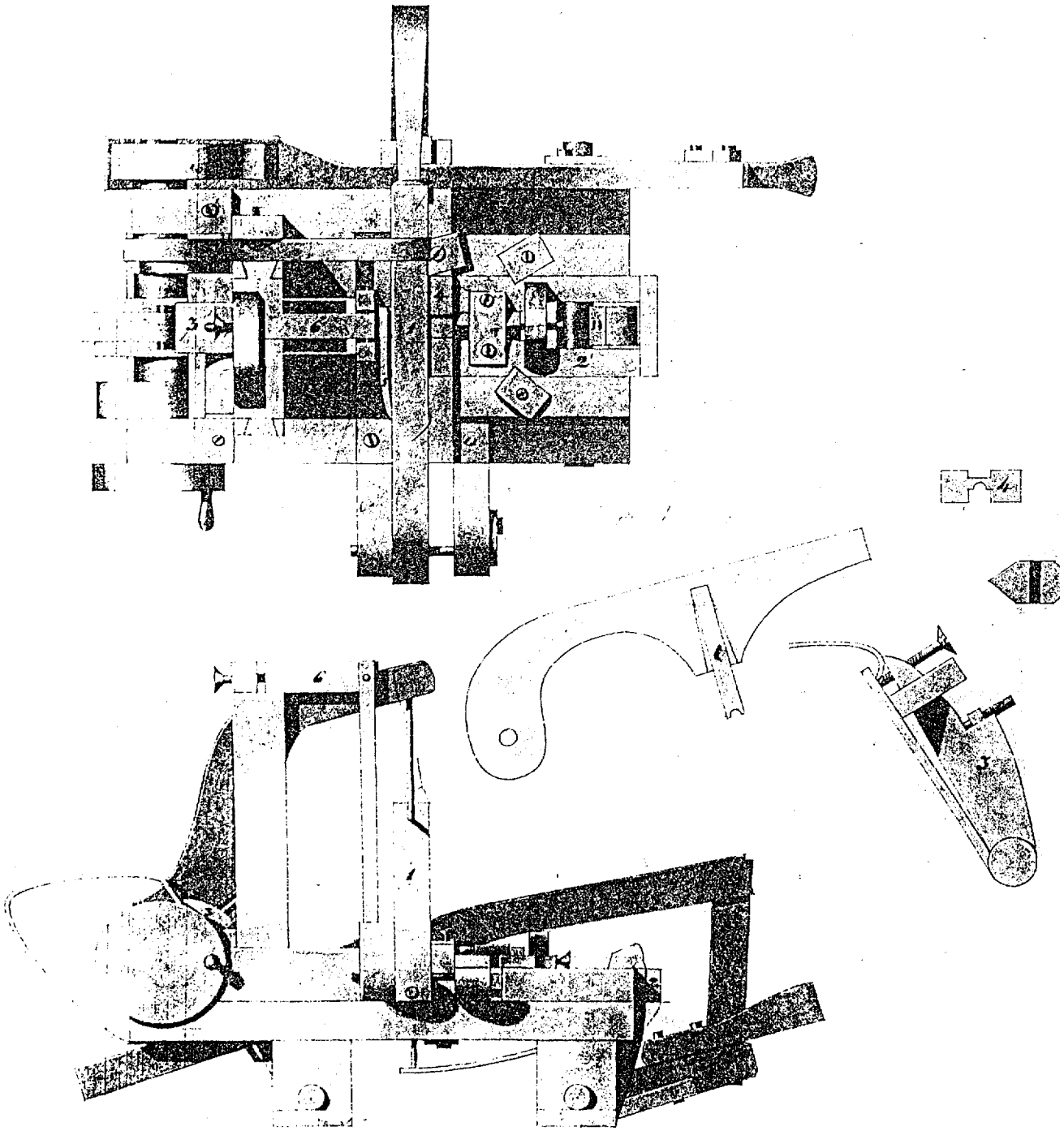

X ,448 Feb 28 1833 of Timothy Allen, of Plymouth, Mass.
Letters Patent

The Schedule referred to in these Letters Patent, and making part of the same containing a description in the words of the said Timothy Allen himself, of his improvement in the machine for making Coopers Rivets of iron or other metal.

---

To all persons to whom these presents shall come: Be it known that I Timothy Allen of Plymouth in the County of Plymouth, and State of Massachusetts have invented a new and useful machine for the purpose of making Coopers Rivets, and that the following is an exact description of the construction and operation of the said Machine, as will appear by the drawing attached hereto.

Fig. No 1. represents the upper knife which is the first motion cutting the rod off, and conveying it down at a proper distance, for the punch to convey it into the die. No 2. is the slide by which the rod is conveyed into the die, and is there held till headed, and then acts as a clever to push the rivet from the die. No 3 is the heading lever which has two motions the first to prevent the rod from being pushed too far before it is headed, the second is to head the rivet – No 4. is the under knife upon which the rod rests when cut off, by taking out this knife, the operation will be seen more clearly.

No 5, is a gauge which can be moved so as to make the head larger or smaller, and the screw in slide No 2, makes the shank long or short.

No 6. represents the manner in which the die is held in which the rivet is headed, which is done by a screw. Let the spindle be turned, so that figure 1. will move first. The rods are rounded after the manner of wire drawing, through a steel plate, by water power. I also have an improvement on the above plan of making small rivets cold, those made now being of hot iron. I also intend to convey the rod into the dies, which are to move, by the upper knife and a lever, the punch will then have but one motion. The dies are to gripe the rivet, and the punch to hold it until headed: the punch will then push it out.

What I particularly claim as my invention is the conveyance by the punch and holding the rod while headed by the punch, and clearing the rivet

[Left margin, written vertically:] [illegible] Restored 8th July 1842

X7448 by the punch. The die and header are of cast iron. I do not claim the exclusive right of the cast iron header, but I claim the solid cast iron die, as applied to making rivets by one operation.

In witness of the above, I have hereunto set my hand, this twenty-sixth day of December eighteen hundred & thirty-two.

Witnesses

Thomas Pinnell

George Everson

Timothy Allen

E.G.